United States Patent [19]
Seo

[11] Patent Number: 5,283,647
[45] Date of Patent: Feb. 1, 1994

[54] COMPATIBLE DIGITAL PROCESSING UNIT FOR TELETEXT AND CONTROL METHOD THEREOF

[75] Inventor: Moon H. Seo, Seoul, Rep. of Korea

[73] Assignee: Samsung Electronics Co. Ltd., Suwon, Rep. of Korea

[21] Appl. No.: 736,762

[22] Filed: Jul. 29, 1991

[30] Foreign Application Priority Data

Jan. 28, 1991 [KR] Rep. of Korea ............ 91-1403

[51] Int. Cl.⁵ ............................................. H04N 7/04
[52] U.S. Cl. ................................. 348/468; 348/464
[58] Field of Search .................. 358/142, 146, 147; H04N 7/04

[56] References Cited

U.S. PATENT DOCUMENTS

4,841,365  6/1989  Guenot et al. ............ 370/106 X
4,933,764  6/1990  Kinghorn .................. 358/147 X

Primary Examiner—Victor R. Kostak
Attorney, Agent, or Firm—Robert E. Bushnell

[57] ABSTRACT

The present invention relates to teletext, in which the character multiplex signals of the international title standard can be processed together with those of the North America teletext standard by a compatible digital processing unit for the teletext and a method thereof. A timing clock signal and a byte clock signal are generated if character multiplex signals of the international title standard are provided, in order to store the character multiplex signals in a programmable RAM in synchronization with the generated clock signals and to generate the interrupt request signals at the same time. The character multiplex signals transmitted in the international title standard are compatibly converted into the North America teletext standard in response to the interrupt request signals.

26 Claims, 3 Drawing Sheets

COMPATIBLE DIGITAL PROCESSING UNIT FOR TELETEXT AND CONTROL METHOD THEREOF

BACKGROUND OF THE INVENTION

The present invention relates to teletext for transmitting and receiving character multiplex signals, and more particularly to a teletext digital processing unit and control method which can compatibly process a character signal either in the North America teletext standard or in the international title standard.

In the teletext, the character multiplex signals which are superposed to be transmitted during vertical returning periods, video signals, and the transmitted video signals and character multiple signals thereof are simultaneously displayed to offer necessary information for users.

Figure 1:
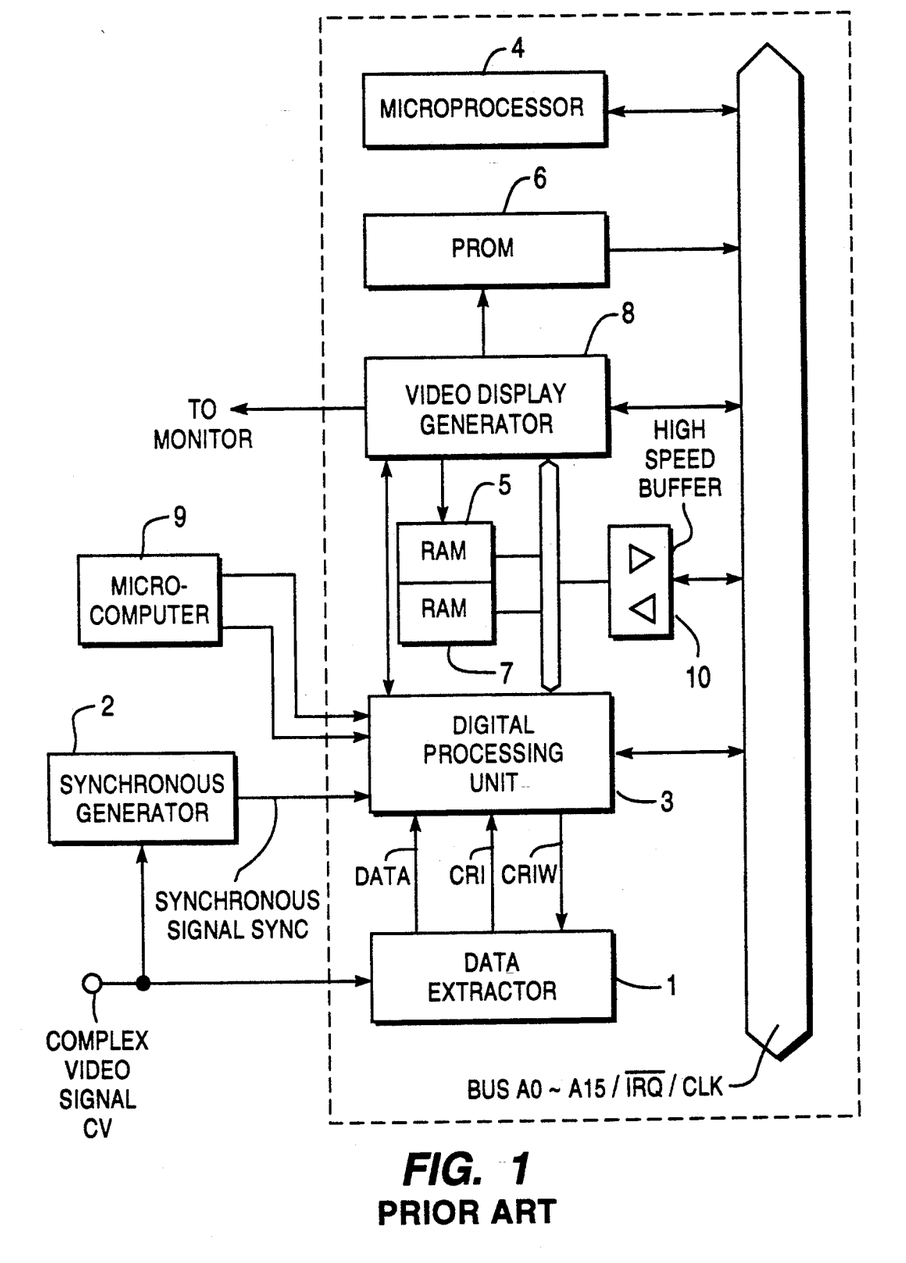
FIG. 1 is a block diagram of a conventional system to process the data format in the North America teletext standard.

In a processing system for data format according to the North America teletext standard as shown in FIG. 1, if a complex video signal is applied, the teletext data are extracted from the complex video signal by a teletext data extractor 1 and also a teletext synchronous signal is extracted from the complex video signal by a teletext synchronous generator 2.

At this time, a synchronous signal SYC provided from the teletext synchronous generator 2, a character data DATA and a system synchronous data CRI provided from the teletext data extractor 1 are applied to a digital processing unit 3 to generate parallel character data, address signals A0~A15, interrupt request signals IRO, and synchronous signals CLK. These signals provided from the digital processing unit 3 are applied to a microprocessor 4 through buses and the teletext is driven according to output signals of the microprocessor 4.

That is, according to the output signal from the microprocessor 4, data stored in a programmable random access memory 5, a programmable read only memory 6, and a video random access memory 7 are provided through a high speed buffer 10 and the output data are also applied to a monitor through a video display generator 8. At this time, the digital processing unit 3 is controlled by a Microcomputer 9. However, this type of system can process the data format only in the North America teletext standard. Therefore, in the North America teletext standard, 36-byte data composed of color burst signals, 16-bit system synchronous signals, 8-bit frame codes for representing 8-bit data transmission formats, 5-byte address data, and 28-byte character data including parity bits, are transmitted during one horizontal synchronous period and their maximum frequency becomes 2.86 MHZ.

In the international title standard, however, color burst signals, 7-cycle system synchronous signals of 0.5 MHZ, 8-bit frame codes for representing 8-bit data transmission formats, and 2-byte character data including parity bits are transmitted during one horizontal synchronous period and their frequency is 0.5 MHZ. Therefore, a problem exists that processing data transmitted in the different forms as above, require different systems.

SUMMARY OF THE INVENTION

Therefore, the invention has an object to provide a compatible teletext digital processing unit and teletext control method thereof, which can not only receive and process the data format in the North America teletext standard, but also the character multiplex signals transmitted through the international title standard. According to the present invention, a compatible digital processing unit of a teletext in which character multiplex signals are overlapped and transmitted during a horizontal returning period of a video signal and the transmitted character multiplex signals are processed as a title on a screen, comprises: a signal detection circuit for extracting the character multiplex signal data during the horizontal returning period; a signal generation means connected to an output stage of the signal detection circuit for generating a synchronous signal corresponding to a data format of the transmitted character multiplex signal after detecting the data format form the overlapped data during the horizontal returning period; and a signal processing means connected to an output stage of the signal generation means for processing and storing the transferred character multiplex signal according to the generated synchronous signal.

According to the present invention, a compatible teletext control method, in which the character multiplex signals are overlapped and remotely transferred during the horizontal returning period of the video signal and the transferred signals are compatibly processed according to the data format, comprises the steps of: a data detection for determining whether a character multiplex signal in the international title standard enters is included in the input data; character multiplex signal processing for generating and storing the character multiplex signal if the input data included international title standard data; interrupt signal detection processing for detecting an interrupt request signal provided after processing the input character multiplex signal in the character multiplex signal processing step; and data conversion for converting the character complex signal in the international title standard to the character multiplex signal in the North America teletext standard.

DETAILED DESCRIPTION OF THE PREFERRED EMBODIMENT

The present invention will be described in more detail with reference to the attached drawings.

Figure 2:
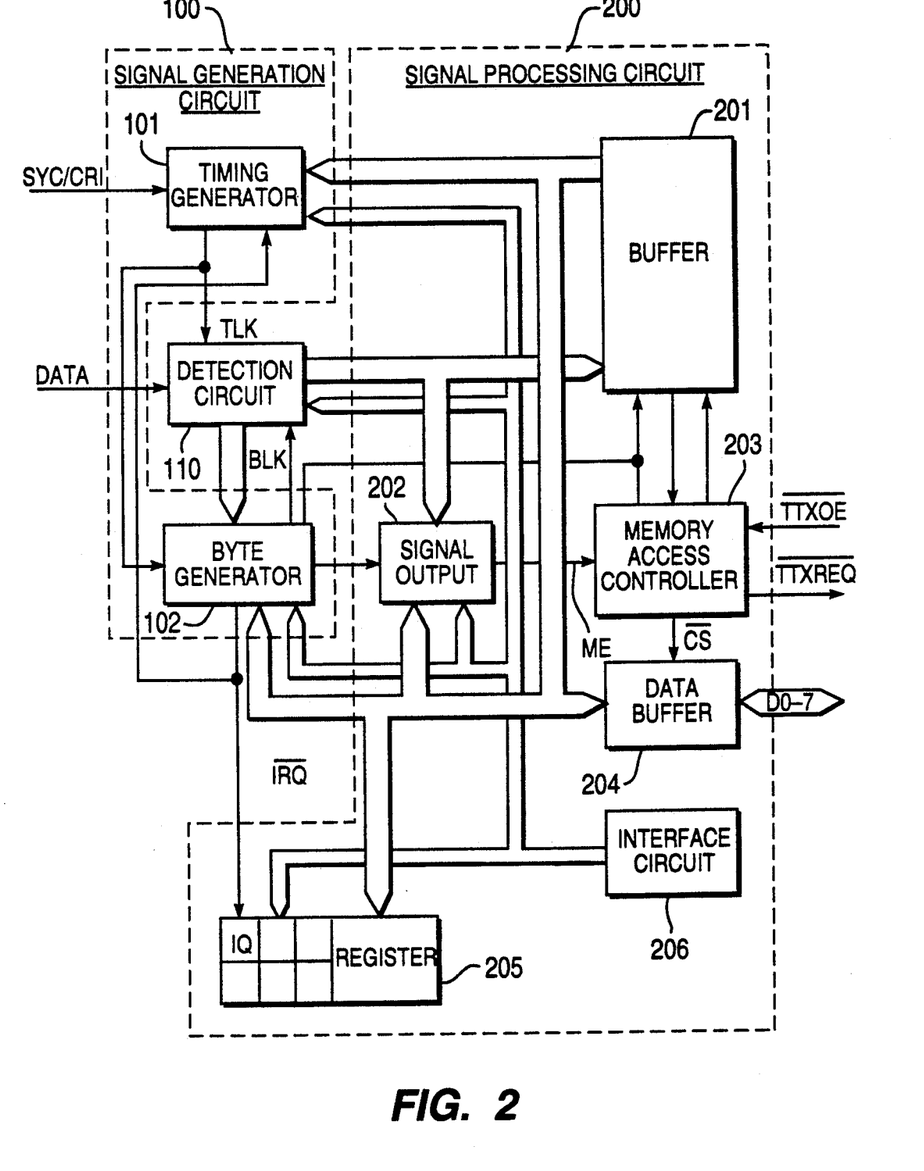
FIG. 2 is a block diagram of a digital processing unit for teletext according to the present invention.

FIG. 2 is a block diagram of a compatible digital processing unit for teletext according to the present invention. In FIG. 2, the digital processing unit comprises a signal detection circuit 110 for converting character multiplex signal data, a signal generation circuit 100 for generating synchronous signals according to a transmitted data format, and a signal processing circuit 200 for providing interrupt signals after storing the character data in an assigned address according to the synchronous signal provided from the signal generation circuit 100. That is, a timing clock generator part 101 and a byte clock generator part 102 in the signal generation circuit 100 are connected to the output stage of the signal generation circuit 100 for converting the input teletext data to the 8-bit parallel data, in order to generate the timing clock and the byte clock according to the frame code of the 8-bit parallel data.

At this time, in the case of the character multiplex signal in the international title standard, the clock frequency of 1 MHZ generated in the timing clock generator 101 is changed to the clock frequency of 0.5 MHZ and the byte clock generator 102 generates the frame code and the byte clock which are able to process the data of the international title standard. Then, the parallel data is provided in synchronization with the byte clock frequency generated in the byte clock generator 102.

The output stage of the signal detection circuit 100 is connected to a buffer part 201 of the signal processing circuit 200 for storing the transmitted data temporarily, and connected to a signal output part 202 of the signal processing circuit 200 for providing a memory assess enable signal ME to control the address to be assigned. Subsequently, the output stage of the buffer part 201 is connected to a memory access controller part 203 which receives and provides a teletext request signal e,ovs/TXREQ/ signal and a teletext disable signal $\overline{TTXOE}$ to control the driving of a programmable random access memory controller part, which is not shown by the memory access enable signal.

On the other hand, a data buffer part 204 is connected to the output stage of the memory access controller part 203 so that the data temporarily stored in the buffer part 201 is stored into the programmable random access memory according to the address assigned by the memory access controller part 203 by a synchronous signal $\overline{CS}$ provided from the memory access controller part 203. A register 205 is connected to the output stage of the byte clock generator part 102 and temporarily stores the interrupt signal IRQ according to the frame code. An interface circuit 206 connects systems to each other.

Figure 3:
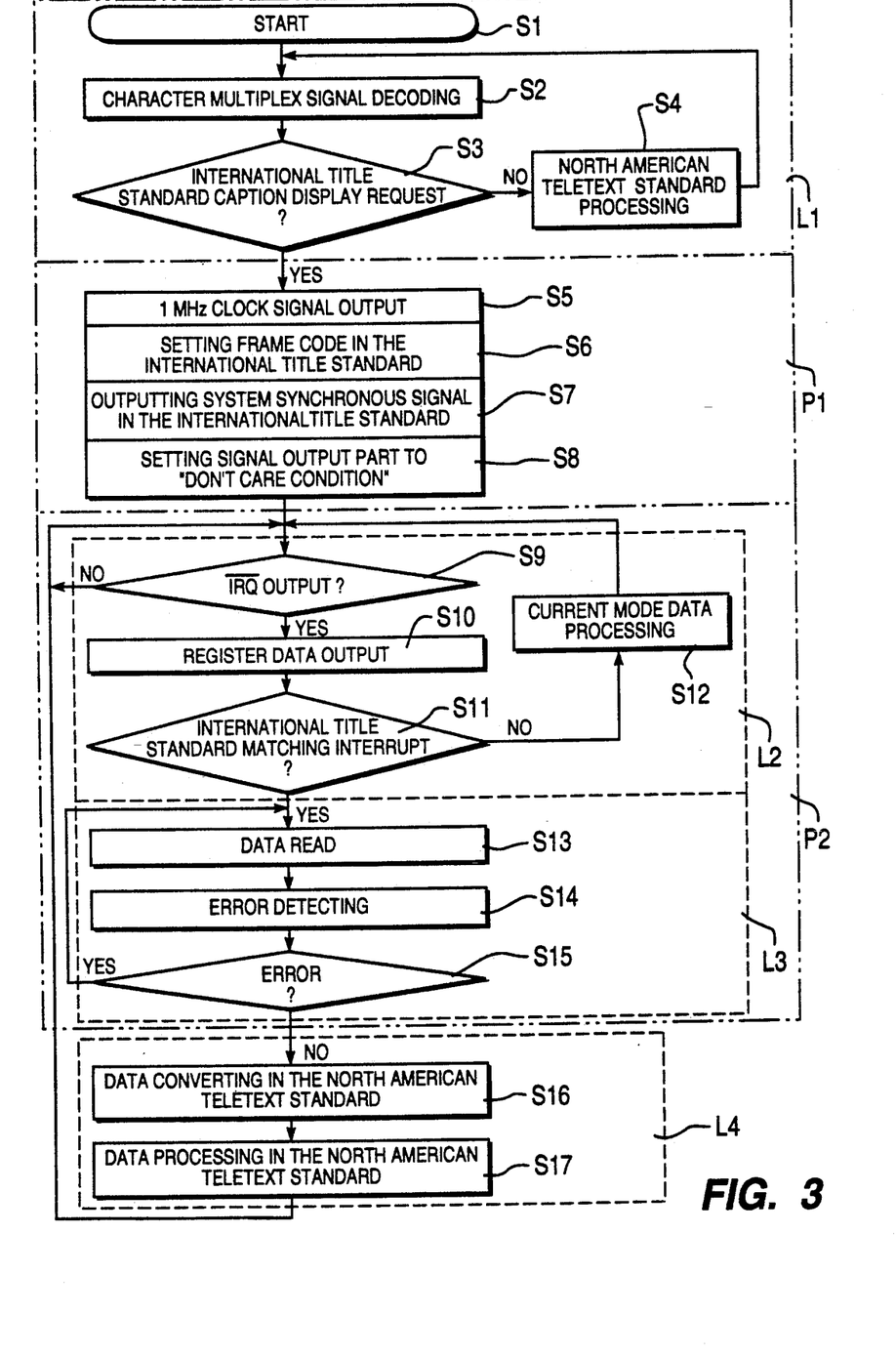
FIG. 3 is a flow chart for explaining a control method of the teletext according to the present invention.

FIG. 3 is a flow chart for explaining the compatible control method of the teletext according to the present invention. In FIG. 3, the control method includes a data detection routine L1 for determining whether the international title standard is present in the input character multiplex signal, a character multiplex signal processing routine P1 for controlling a digital processing unit of the teletext when the international title standard is entered, an interrupt signal detection routine P2 for detecting whether the interrupt signal is provided in the character multiplex signal processing routine P1, an a data conversion routine L4 for converting the data of the international title standard to the data of the North America standard if the interrupt signal is detected in the interrupt signal detection process P2.

The data detection routine L1 includes a start step S1, a step S2 for decoding character multiplex signals serially provided from the micromcomputer 9 in FIG. 1, a step S3 for distinguishing whether the input data requires the signal process of the international title standard, and a step S4 for processing the character multiplex signal in the North America teletext standard when the data processing in the international title standard is not necessary.

Also, the character multiplex signal processing routine P1 is performed when the data process of the international title standard is proved to be necessary in the data detection routine L1, and included a step S5 for providing a control signal to shift the data in parallel by the timing clock generator part 101 in the signal generation circuit 100, a step S6 for controlling the frame code detected from the byte clock generator 102 to be set to the international title standard, a step S7 for providing a system synchronous signal window pulse CRIW to generate a system synchronous signal CRI in the international title standard at the data extractor part 1 in FIG. 1, and a step S8 for setting the signal output part 202 in the signal processing circuit 200 to the don't care condition.

The interrupt signal detection routine P2 detects the interrupt signal $\overline{IRQ}$ provided after the digital processing unit of FIG. 2 is set to the international title standard, and includes a step S9 for distinguishing whether the interrupt signal $\overline{IRQ}$ is provided, a step S10 for providing the data of a register 205 in FIG. 2 when the interrupt signal $\overline{IRQ}$ is applied, a step S11 for distinguishing whether the data provided from the register 205 is in the international title standard, a step S12 for carrying out the current interrupt if the data is not in the international title standard, a step S13 for reading out the program stored in the programmable random access memory 5 to process the data if the data is in the international title standard, a step S14 detecting the general error of the character multiplex signal, a step S15 for distinguishing whether the error is generated, a step S16 for converting the data in the international title standard to that in the North America teletext standard if the error is not generated, and a step S17 for performing the program to process the data converted into the North America teletext standard.

In the present invention described as above, the operation will now be explained with reference to the compatible digital processing unit of the teletext as shown in FIG. 2. If the teletext synchronous clock signal SYC and the system synchronous signal CRI are applied to the timing clock generator 101 in the signal generation circuit 100 of the digital processing unit, the clock signal of 1 MHz is generated from the timing clock generator 101 and this clock signal of 1 MHz is applied to the signal detection circuit 110 for converting the teletext data to the 8-bit parallel data. Then, the teletext data is shifted to the 8-bit parallel data.

The frame code out of the data provided form the signal detection circuit 110, which represents the data transmission format of the international title standard, is applied to the timing clock generator 101 and the byte clock generator 102 to change the clock frequency from 0.5 MHz to 1 MHz and to generate the byte clock for processing the data in the international title standard.

The parallel data of the character multiplex signal provided from the signal detection circuit 110 is temporarily stored in the buffer part 201 of the signal processing circuit 200 by the byte clock generate from the byte clock generator 102 in the signal generation circuit 100. On the other hand, the character multiplex signal provided from the signal detection circuit 110 is applied to the signal output circuit 202 in the signal processing circuit 200 to set the present mode to the don't care state.

Then, the memory access enable signal ME to assign the address of the memory is applied to the memory access controller part 203 so that the teletext request signal $\overline{TTXREQ}$ is provided to the programmable random access memory controller part (not shown). The programmable random access memory controller part assigns the address in a digital random access memory buffer which is not shown and transmits the teletext disable signal $\overline{TTXOE}$ to the memory access controller part 203 after generating one cycle of the system clock.

If the teletext disable signal $\overline{TTXOE}$ is applied to the memory access controller part 203, the memory access controller part 203 provides a control signal to the buffer part 201 in the signal processing circuit 200 to control the stored data, and provides a synchronous signal $\overline{CS}$ to the data buffer 204 in the data processing circuit 200 at the same time.

By the control signal to the buffer part 201 and the synchronous signal $\overline{CS}$, the data stored in the buffer part 201 is applied to the data buffer 2094 and the character multiplex signal applied to the data buffer 204 is stored at an assigned address of a random access memory (not shown).

On the other hand, if a signal for informing the end of the output signal is provided after completion of data transmission, the byte clock generator 102 in the signal generation circuit 100 provides the interrupt request signal $\overline{IRQ}$ to process the character multiplex signal and then the register 205 stores the interrupt request signal $\overline{IRQ}$. The interrupt request signal $\overline{IRQ}$ provided from the byte clock generator 102 is applied to the timing clock generator 101 to synchronize the clock frequency according to the data transmission format.

Now, the above processes will be described in detail with reference to FIG. 3.

First, the data applied from the microcomputer 9 is transmitted through a transmission line in the step S2 of the data detection routine L1, and it is determined whether the transmitted data is in the international title standard in step S3 of the data detection routine L1.

If the data is in the international title standard, the clock frequency of the timing clock generator part 101 in the signal generation circuit 100 is controlled to be 1 MHz ian step S5 of the character multiplex signal processing routine P1, and the frame code provided from the byte clock generator 102 in the signal generation circuit 100 is set to the international title standard in step S6 of the character multiplex signal processing routine P1.

Subsequently, the system signal window pulse CRIW for changing the system synchronous signal CRI to that in the international title standard is provided to the data extractor part 1 in FIG. 1 by step S6 of the character multiplex signal processing routine P1.

Also, the signal output part 202 in the signal processing circuit 200 in FIG. 2 is set to the don't care state in step S8 of the character multiplex signal processing routine P1, where if a display request signal of the character multiplex signal in the international title standard is applied to microcomputer 9, then microcomputer 9 the MICOM 9 provides the control signal to the digital processing unit, to process the character multiplex signal in the international title standard.

After controlling of the digital processing unit, the interrupt request signal $\overline{IRQ}$ is provided to the central processing unit to process and display the character multiplex signal in the international title standard.

The microcomputer 9 checks that the interrupt request signal $\overline{IRQ}$ is generated in step S9 of the interrupt detection routine L2 and if the interrupt request signal $\overline{IRQ}$ is proven to be applied, the microcomputer 9 reads out the interrupt signal stored in the interrupt output register by Step S1 of the interrupt detection routine L2.

Next, it is determined whether this interrupt request signal is for the international title standard in step S11 of the interrupt detection routine L2, and if the interrupt request signal $\overline{IRQ}$ is not for processing the character multiplex signal in the international title standard, present interrupt is executed in the step S12 of the interrupt detection routine L2.

On the other hand, if the interrupt request signal $\overline{IRQ}$ is for processing the character multiplex signal in the international title standard, the data of the character multiplex signal stored in the programmable RAM 5 in FIG. 1 is read out through the data buffer part 204 in FIG. 2 by step S13 of the interrupt processing routine L3.

Step S14 of the interrupt processing routine L3 provide error detection from the transmitted character multiplex signal and the error is distinguished in step S15 of the interrupt processing routine L3. AT this time, if an error is detected the above process is repeated form the interrupt processing routine L3. But, if the error is not generated, the data in the international title standard is converted to that in the North America teletext standard by step S16 of the interrupt processing routine L3, and the program for processing the data converted to the North America teletext standard is performed in the S16 of the data conversion routine L4.

That is, the interrupt signal stored in register 205 is read out by the interrupt request signal $\overline{IRQ}$ in the interrupt signal detection process P1, where the signal $\overline{IRQ}$ is provided from the buffer part 201 in the signal processing circuit 200 after completing the data transmission.

Subsequently, if the interrupt signal requires the process of the character multiplex signal in the international standard, the data stored in the programmable RAM through the data buffer part 204 in the signal processing circuit 200 is converted to that in the North America teletext standard in the data conversion routine L4.

As mentioned up to now, according to the present invention, the character multiplex signal in the international title standard is stored in the programmable RAM as that in the North America teletext standard by the compatible digital processing unit of teletext, and at the same time, the interrupt request signal in the international title standard at the central processing unit is temporarily store din the register 205.

Subsequently, this stored data is converted and processed to the North America teletext standard by the interrupt request signal $\overline{IRQ}$, so that the character multiplex signal transmitted at 21H line of the vertical returning period is processed when the input character multiplex signal is in the international title standard. On the other hand, if the input character multiplex signal is in the North America teletext standard, the character multiplex signal transmitted at 14~19H lines of the vertical returning period is processed.

Thus, although the system operates for the North America teletext standard, the character multiplex signal in the international title standard is compatibly processed as well.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A compatible digital processing unit of teletext in which character multiplexed signals are overlapped and transmitted during a horizontal returning period of video signals and the transmitted character multiplexed signals are processed as a title on a screen, the compatible digital processing unit comprising:

signal detection means for extracting a first character multiplexed signal of said character multiplexed signals during the horizontal returning period;

signal generation means connected to an output stage of said signal detection means, for generating a system synchronous signal corresponding to a data format of said first character multiplexed signal after detecting said data format from one of the overlapped character multiplexed signals during the horizontal returning period; and signal processing means connected to an output stage of said signal generation means, for processing and storing said transmitted character multiplexed signals in dependence upon the system synchronous signal.

2. The compatible digital processing unit of claim 1, wherein said signal processing means comprises:

first means, responsive to said transmitted character multiplexed signals, for generating a clock signal having a given frequency operable in the data format of an international title standard;

second means for identifying frame codes of said transmitted character multiplexed signals in the data format of said international title standard; and third means for generating said system synchronous signal to enable processing and storing of said transmitted character multiplexed signals.

3. The compatible digital process unit of claim 1, wherein said data format of said first character multiplexed signal represents one of a North America teletext data standard and an international title data standard, said North America teletext data standard being transmitted during the horizontal returning period with a maximum frequency of 2.86 MHz, and comprising:

thirty-six byte data composed of color burst signals; the system synchronous signal having sixteen bits; frame code having eight bits for representing eight bit data transmission formats; five byte address data; and twenty-eight byte character data including parity bits, and said international title data standard being transmitted during said horizontal returning period with a frequency of 0.5 MHz, and comprising:

color burst signals; said system synchronous signal; said frame code having eight bits for representing eight bit data transmission formats; and two byte character data including parity bits.

4. A compatible control method for teletext, in which character multiplexed signals are overlapped and remotely transferred during a horizontal returning period of a video signal and said transferred character multiplexed signals are compatibly processed according to data formats, the method comprising:

a data detection routine for distinguishing whether one of the character multiplexed signals is in an international title standard;

a character multiplexed signal processing routine for processing and storing said one of the character multiplexed signals when in the international title standard;

an interrupt signal detection routine for detecting an interrupt request signal provided after processing said one of the character multiplexed signals in the character multiplexed signal processing routine; and a data conversion routine for converting said one of the character multiplexed signals in the international title standard into a North America teletext standard.

5. The method according to claim 4, wherein said interrupt signal detection routine comprises:

an interrupt detection routine for detecting whether and when the interrupt request signal is generated, and whether data stored a register corresponds to the international title standard; and an interrupt processing routine for reading the stored register data when the interrupt request signal corresponding to the international title standard is detected in said interrupt detection routine.

6. The compatible control method of claim 4, wherein said character multiplexed signal processing routine comprises the steps of:

providing a clock signal with a given frequency for processing said character multiplexed signals in the international title standard;

setting frame codes of said character multiplexed signals corresponding to the international title standard; and generating a system synchronous signal for enabling processing of said one of the character multiplexed signals when in the international title standard.

7. The method of claim 4, wherein a first one of said data formats of said character multiplexed signals representing the North America teletext standard is transmitted during said horizontal returning period with a maximum frequency of 2.86 MHz, and comprise:

thirty-six byte data composed of color burst signals; said system synchronous signals having sixteen bits; frame code having eight bits for representing eight bit data transmission formats; five byte address data; and twenty-eight byte character data including parity bits, and wherein a second one of said data formats of said character multiplexed signals representing the international title standard is transmitted during said horizontal returning period with a frequency of 0.5 MHz, and comprise:

color burst signals; said system synchronous signals; frame code having eight bits for representing eight bit data transmission formats; and two byte character data including parity bits.

8. A compatible control method for teletext, in which character multiplexed signals are overlapped and remotely transferred during a horizontal returning period of a video signal and said transferred character multiplexed signals are compatibly processed according to data formats, the method comprising:

a data detection routine for detecting whether the character multiplexed signals are in an international title standard;

a character multiplexed signal processing routine for generating and storing said character multiplexed signals in the international title standard, said character multiplexed signal processing routine comprising the steps of:

providing a clock signal with a given frequency operable with the international title standard, setting a frame code corresponding to the international title standard, providing a system synchronous signal corresponding to the international title standard, and setting a register to an optional condition;

an interrupt signal detection routine for detecting an interrupt request signal provided after processing said character multiplexed signals in the character multiplexed signal processing routine; and a data conversion routine for converting said character multiplexed signals in the international title standard into a North America teletext standard.

9. The method of claim 8, wherein a first one of said data formats represents the North America teletext standard is transmitted during said horizontal returning period with a maximum frequency of 2.86 MHz, and comprises:

thirty-six byte data composed of color burst signals; said system synchronous signal having sixteen bits; said frame code having eight bits for representing eight bit data transmission formats; five byte address data; and twenty-eight byte character data including parity bits, and wherein a second one of said data formats represents the international title standard is transmitted during said horizontal returning period with a frequency of 0.5 MHz, and comprises;

color burst signals; said system synchronous signal; said frame code having eight bits for representing eight bit data transmission formats; and two byte character data including parity bits.

10. A digital processing unit, comprising:

signal detection means for extracting a first character multiplexed signal for a video signal during a horizontal synchronous period of the video signal, when the first character multiplexed signal corresponds to one of an international title standard and a North America standard;

signal generating means for generating a system synchronous signal in response to a data format corresponding to said first character multiplexed signal, said signal generating circuit comprising:

a clock generator providing a clock signal of a given frequency when the first character multiplexed signal corresponds to the international title standard;

a frame code setting circuit setting a frame code corresponding to the first character multiplexed signal;

means for providing the system synchronous signal in response to a window pulse; and a register set to an optional condition when the first character multiplexed signal corresponds to the international title standard; and signal processing means for, in response to the system synchronous signal, converting said first character multiplexed signal corresponding to the international title standard into the North America standard, and processing said first character multiplexed signal in the North America standard.

11. The digital processing unit of claim 10, wherein said digital processing unit is part of a television transmission system.

12. The digital process unit of claim 10, wherein said first character multiplexed signal corresponding to the North America standard is transmitted during said horizontal returning period with a maximum frequency of 2.86 MHz, and comprises:

a data format comprising thirty-six byte data composed of color burst signals; said system synchronous signal having sixteen bits; said frame code having eight bits for representing eight bit data transmission formats; five byte address data; and twenty-eight byte character data including parity bits, and wherein said first character multiplexed signal corresponding to the international title standard is transmitted during said horizontal returning period with a frequency of 0.5 MHz, and comprises;

a data format comprising color burst signal; said system synchronous signal; said frame code having eight bits for representing eight bit data transmission formats; and two byte character data including parity bits.

13. A digital processing unit for processing a character multiplexed signal, said digital processing unit comprising:

detection means for detecting a frame code of the character multiplexed signal corresponding to one of a North America teletext standard and an international teletext standard;

generating means for generating a clock signal corresponding to the character multiplexed signal in response to a system synchronous signal corresponding to one of the North America teletext standard and the international teletext standard, and the frame code; and processing means for converting the character multiplexed signal corresponding to the international title teletext standard into the North America teletext standard, and for processing said character multiplexed signal in the North America teletext standard.

14. The digital processing unit of claim 13, wherein said digital processing unit is part of a television transmission system.

15. The digital process unit of claim 13, wherein a first data format representing the North America teletext standard is transmitted during a horizontal returning period of the character multiplexed signal with a maximum frequency of 2.86 MHz, and comprise:

thirty-six byte data composed of color burst signals; said system synchronous signal having sixteen bits; said frame code having eight bits for representing eight bit data transmission formats; five byte address data; and twenty-eight byte character data including parity bits;

and wherein a second data format representing the international teletext standard is transmitted during said horizontal returning period with a frequency of 0.5 MHz, and comprises:

color burst signals; said system synchronous signal; said frame code having eight bits for representing eight bit data transmission formats; and two byte character data including parity bits.

16. A method in a digital processing unit for processing a character multiplexed signal, said method comprising the steps of:

detecting a system synchronous signal corresponding to a data format of the character multiplexed signal;

detecting a frame code from said data format of said character multiplexed signal representative of one of North America teletext data and international title standard data; 'generating a clock signal corresponding to said one of the North America teletext data nd the international title standard data in response to the system synchronous signal and the frame doe; and providing, form the character multiplexed signal, data corresponding to said one of the North America teletext data and the international title standard data.

17. The method of claim 16, wherein said data format representing the North America teletext data comprises thirty-six byte data, said system synchronous signal having sixteen bits, said frame code having eight bits, five byte address data and twenty-eight byte character data including parity bits.

18. The method of claim 16, wherein a first data format representing the North America teletext data is transmitted during a horizontal returning period of the character multiplexed signal with a maximum frequency of 2.86 Hz, and comprises:
thirty-six byte data composed of color burst signals; said system synchronous signal having sixteen bits; said frame code having eight bits for representing eight bit data transmission formats; five byte address data; and twenty-eight byte character data including parity bits,
and wherein a second data format representing the international title standard data is transmitted during said horizontal returning period with a frequency of 0.5 MHz, and comprises:
color burst signals; said system synchronous signal; said frame code having eight bits fore representing eight bit data transmission formats; and two byte character data including parity bits.

19. A method in a digital processing unit, comprising the steps of:
decoding a video signal;
determining if the video signal has a data format corresponding to one of a North America standard and an international title standard;
if the video signal does not have said data format in one of the international title standard and the North America standard, ending the method;
if the video signal has the data format of the North America standard, processing said video signal and returning to the decoding step;
if the video signal has the data format of the international title standard, setting a clock pulse to a frequency operable with the data format of the international title standard, setting a frame code of the video signal corresponding to the international title standard, generating a system synchronous signal in the international title standard, setting a signal output port to a don't care condition;
detecting an interrupt signal;
providing register data corresponding to the video signal when the interrupt signal is detected;
processing said register data;
determining whether an error exists;
if an error, exists, returning to the detecting step;
converting said register data form the international title standard to the North America standard;
processing said converted data; and
returning to the detecting step.

20. The method of claim 19, wherein said data format of the video signal corresponding to the North America standard is transmitted during a horizontal returning period of the video signal with a maximum frequency of 2.86 MHz, and comprises:
thirty-six byte data composed of color burst signals; said system synchronous signal having sixteen bits; said frame code having eight bits for representing eight bit data transmission formats; five byte address data; and twenty-eight byte character data including parity bits,
and wherein said data format of the video signal corresponding to the international title standard is transmitted during the said horizontal retuning period with a frequency of 0.5 MHz, and comprises:
color burst signals; said system synchronous signal; said frame code having eight bits representing eight bit data transmission formats; and two byte character data including parity bits.

21. A method in a digital processing unit comprising;
a data detection routine for determining if a character multiplexed signal corresponds to one of an international title standard and a North America title standard by detecting a frame code of the character multiplexed signal;
an international title standard signal processing routine for establishing parameters corresponding to the international title standard, and converting the character multiplexed signal to the North America title standard, when the international title standard is determined in the data detection routine;
a North America title standard processing routine for processing the character multiplexed signal corresponding to the North America title standard.

22. The method of claim 21, wherein the international title standard signal processing routine comprises the steps of:
producing a one megahertz clock pulse;
setting the frame code corresponding to the character multiplexed signal;
providing a system synchronous signal in response to a window pulse; and
setting a data register to a don't car condition.

23. The method of claim 21, wherein data format of the character multiplexed signal corresponding to the North America title standard is transmitted during a horizontal returning period of the character multiplexed signal with a maximum frequency of 2.86 MHz, and comprise:
thirty-six byte data composed of color burst signals; sixteen bit system synchronous signals; eight bit frame codes for representing eight bit data transmission formats; five byte address data; and twenty-eight byte character data including parity bits,
and wherein a data format of the character multiplexed signal corresponding to the international title standard is transmitted during said horizontal returning period with a frequency of 0.5 MHz, and comprise:
color burst signals; a system synchronous signal; eight bit frame code representing eight bit data transmission formats; and two byte character data including parity bits.

24. A digital processing unit comprising:
data detection means for determining if a character multiplexed signal corresponds to one of an international title standard and a North America title standard by detecting a frame code of the character multiplexed signal;
international title standard signal processing means for establishing parameters corresponding to the international title standard, and for converting the character multiplexed signal to the North America title standard, when the international title standard is determined in the data detection means;

North America title standard processing means for processing the character multiplexed signal corresponding to the North America title standard.

25. The digital processing unit of claim 24, wherein the international title standard signal processing means, in response to the frame code corresponding to the international title standard, comprises: means for producing a one megahertz clock pulse; means for setting the frame code corresponding to the character multiplexed signal; means for providing a system synchronous signal in response to a window pulse; and means for setting a data register to a don't care condition.

26. The digital processing unit of claim 24, wherein a data format of the character multiplexed signal corresponding to the North America title standard is transmitted during a horizontal returning period with a maximum frequency of 2.86 MHz, and comprises:

thirty-six byte data composed of color burst signal; sixteen bit system synchronous signals; eight bit frame codes for representing eight bit data transmission formats; five byte address data; and twenty-eight byte character data including parity bits, and wherein a data format of the character multiplexed signal corresponding to the international title standard is transmitted during said horizontal returning period with a frequency of 0.5 MHz, and comprises:

color burst signals; system synchronous signals; eight bit frame codes representing eight bit data transmission formats; and two byte character data including parity bits.

* * * * *

UNITED STATES PATENT AND TRADEMARK OFFICE
CERTIFICATE OF CORRECTION

PATENT NO. : 5,283,647
DATED : Feb. 1, 1994
INVENTOR(S) : Moon Hwan Seo

It is certified that error appears in the above-indentified patent and that said Letters Patent is hereby corrected as shown below:

Column 2,

Line 65,     change "signal generation circuit 100" to --signal detection circuit 110--;

Column 3,

Line 20,     change "e,ovs/TXREQ/" to --$\overline{\text{TTXREQ}}$--

Line 45,     change "an" to --and--;

Line 62,     change "included" to --includes--;

UNITED STATES PATENT AND TRADEMARK OFFICE
CERTIFICATE OF CORRECTION

PATENT NO. : 5,283,647
DATED : 1 February 1994
INVENTOR(S) : Moon Hwan Seo

It is certified that error appears in the above-indentified patent and that said Letters Patent is hereby corrected as shown below:

Column 4,

Line 49,    change "generate" to --generated--;

Column 5,

Line 7,    change "2094" to --204--;

Line 31,    change "ian" to --in--;

Line 48,    delete "the MICOM9";

Line 60,    change "Step S1" to --step S10--;

Column 6,

Line 11,    change "AT" to --At--;

UNITED STATES PATENT AND TRADEMARK OFFICE
CERTIFICATE OF CORRECTION

PATENT NO. : 5,283,647
DATED : 1 February 1994
INVENTOR(S) : Moon Hwan Seo

It is certified that error appears in the above-indentified patent and that said Letters Patent is hereby corrected as shown below:

IN THE CLAIMS

Column 8,

Line 32,     change "comprise" to --comprises--;

Line 43,     change "comprise" to --comprises--;

Column 10,

Line 62,     after "standard data;", insert a new paragraph;

Line 64,     change "nd" to --and--;

Line 66,     change "doe" to --code--;

Line 67,     change "form" to --from--;

UNITED STATES PATENT AND TRADEMARK OFFICE
CERTIFICATE OF CORRECTION

PATENT NO. : 5,283,647
DATED : Feb. 1, 1994
INVENTOR(S) : Moon Hwan Seo

It is certified that error appears in the above-indentified patent and that said Letters Patent is hereby corrected as shown below:

Column 12, line 34, change "car" to --care--.

Signed and Sealed this

Sixth Day of September, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO : 5,283,647
DATED : February 1, 1994
INVENTOR(S) : Moon Hwan Seo

It is certified that error appears in the above-identified patent and that said Letters Patent is hereby corrected as shown below:

Title page, item [75] inventor: should be-- Moon Hwan Seo --.

Signed and Sealed this

Tenth Day of October, 1995

BRUCE LEHMAN

*Attest:*

*Attesting Officer*

*Commissioner of Patents and Trademarks*